United States Patent
Bauer

(10) Patent No.: US 11,766,909 B2
(45) Date of Patent: Sep. 26, 2023

(54) CHASSIS FOR A MOTOR VEHICLE WITH VARIABLY ADJUSTABLE RIDE HEIGHT

(71) Applicant: Dr. Ing. h.c. F. Porsche Aktiengesellschaft, Stuttgart (DE)

(72) Inventor: Lutz Bauer, Wiernsheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/942,235

(22) Filed: Sep. 12, 2022

(65) Prior Publication Data

US 2023/0092218 A1      Mar. 23, 2023

(51) Int. Cl.
*B60G 7/00*      (2006.01)
*B60G 3/20*      (2006.01)

(52) U.S. Cl.
CPC ............... *B60G 7/008* (2013.01); *B60G 3/20* (2013.01); *B60G 7/001* (2013.01); *B60G 2200/184* (2013.01); *B60G 2204/148* (2013.01); *B60G 2500/30* (2013.01)

(58) Field of Classification Search
CPC .......... B60G 7/008; B60G 3/20; B60G 7/001; B60G 2200/184; B60G 2204/148; B60G 2500/30
See application file for complete search history.

(56) References Cited

U.S. PATENT DOCUMENTS

| | | | |
|---|---|---|---|
| 4,267,896 A * | 5/1981 | Hendriksen | B60G 9/003 |
| | | | 267/66 |
| 10,377,434 B2 | 8/2019 | Berghammer | |
| 2005/0062248 A1* | 3/2005 | Winkler | B60G 3/20 |
| | | | 403/4 |
| 2016/0121676 A1* | 5/2016 | Drabon | B60G 7/02 |
| | | | 280/124.125 |
| 2021/0170787 A1* | 6/2021 | Wharram | B60B 35/1009 |

FOREIGN PATENT DOCUMENTS

| | | |
|---|---|---|
| DE | 4309009 A1 | 9/1994 |
| DE | 202015104465 U1 | 10/2015 |
| DE | 202015104465 U1 * | 11/2015 ........... B62D 53/005 |

OTHER PUBLICATIONS

DE-202015104465-U1 Machine English Translation (Year: 2015).*

* cited by examiner

*Primary Examiner* — Jason D Shanske
*Assistant Examiner* — Matthew James O'Neill
(74) *Attorney, Agent, or Firm* — RatnerPrestia

(57) ABSTRACT

A chassis for use in a motor vehicle with variably adjustable drive height includes a subframe assembly for fastening wheel suspensions of the motor vehicle, and a plurality of control arms for guiding a wheel carrier. The control arms are fastened to the subframe assembly via control arm attachment points. A plurality of eccentric adjustment devices are provided for adjusting the toe-in and the basic camber of the motor vehicle. An insert element is provided for receiving an eccentric adjustment device. The insert element is arranged within the chassis in such a way that the position of at least one eccentric adjustment device can be varied by varying the arrangement of the insert element within the chassis.

10 Claims, 6 Drawing Sheets

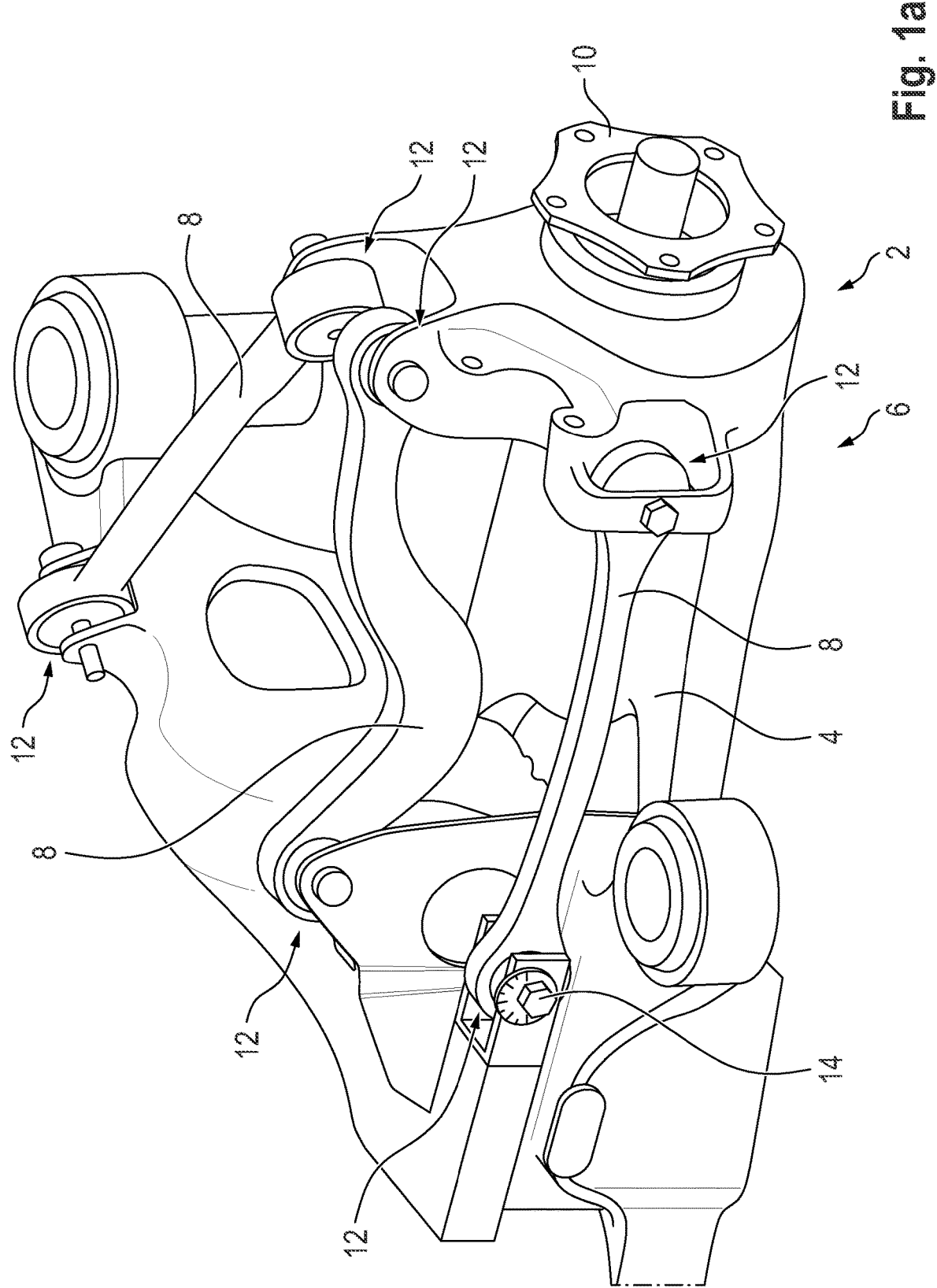

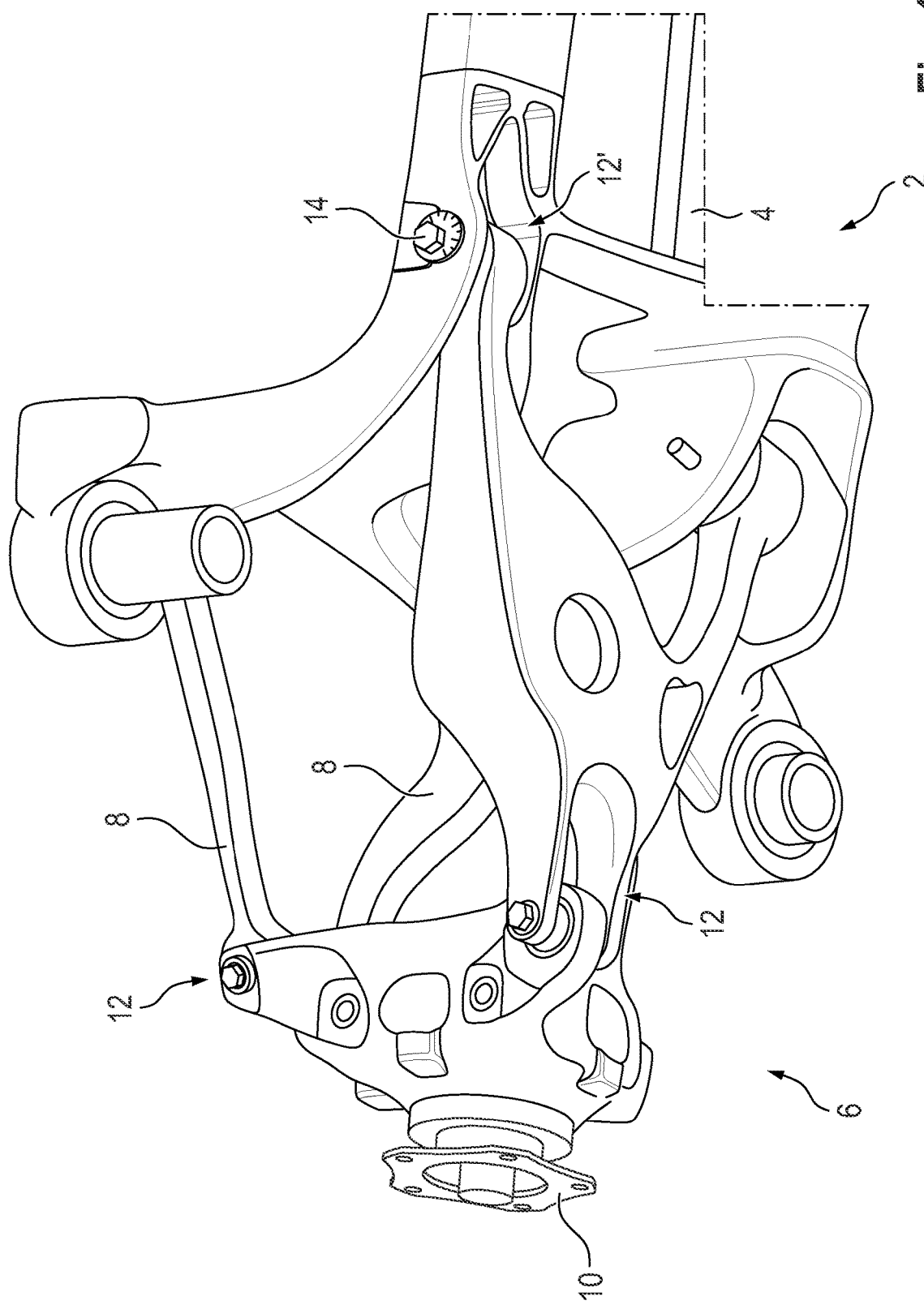

CHASSIS FOR A MOTOR VEHICLE WITH VARIABLY ADJUSTABLE RIDE HEIGHT

CROSS-REFERENCE TO RELATED APPLICATION

This application claims priority to German Patent Application No. 10 2021 124 181.2, filed Sep. 20, 2021, the content of such application being incorporated by reference herein in its entirety.

FIELD OF THE INVENTION

The present invention relates to a chassis for use in a motor vehicle with variably adjustable drive height, and to a motor vehicle with such a chassis.

SUMMARY OF THE INVENTION

The change in the toe-in of an axle of a motor vehicle is generally determined by the attachment points of the control arms. In addition, so-called eccentric adjustment devices arranged at specific control arm attachment points usually exist for precisely adjusting the basic camber and the toe-in during assembly.

Such adjustability of the toe-in and the basic camber also exists in vehicles in which a drive height can be variably adjusted by a forward suspension of the vehicle axle.

When changing the drive height, the adjustments for the toe-in and the basic camber also disadvantageously change so that they must be adjusted again. As a result of the changes made or the new adjustments, the change in the toe-in also disadvantageously deviates from the desired course.

Although it would be conceivable to remedy the deviation of the change in toe-in by a modification of the location of specific attachment points, such a modification is not feasible due to the formation of a multitude of the chassis components as carry-over parts.

Described herein is a chassis for use in a motor vehicle with variably adjustable drive height, which chassis ensures a comparable change in toe-in in a simple and cost-effective manner, even at different drive heights.

Technical features that are disclosed regarding the chassis according to aspects of the invention also apply in connection with the motor vehicle according to aspects of the invention, and vice versa, so that reference is or can always be mutually made with respect to the disclosure regarding the individual aspects of the invention. Expedient embodiments of the invention are stated in the dependent claims.

According to aspects of the invention, a chassis is provided for use in a motor vehicle with a variably adjustable drive height. The chassis according to aspects of the invention comprises a subframe assembly for fastening wheel suspensions of the motor vehicle, a plurality of control arms for guiding a wheel carrier, wherein the control arms are fastened to the subframe assembly via control arm attachment points, as well as a plurality of eccentric adjustment devices for adjusting the toe-in and the basic camber of the motor vehicle. The chassis according to aspects of the invention is characterized in that an insert element for receiving an eccentric adjustment device is also provided, wherein the insert element is designed and can be arranged within the chassis in such a way that the position of at least one eccentric adjustment device can be varied by varying the arrangement of the insert element within the chassis.

According to aspects of the invention, a chassis is thus provided for use in a motor vehicle with variably adjustable drive height, which chassis comprises an insert element for receiving an eccentric adjustment device, which can be arranged variably within the chassis and by its different arrangement within the chassis alone, the position of at least one eccentric adjustment device can be varied. In contrast to the known chassis for use in a motor vehicle with variably adjustable drive height, an adjustment option is thus provided in a simple and cost-effective manner and can be used to ensure a comparable change in toe-in, even at different drive heights.

The option of adapting the change in toe-in to the same profile independently of the drive height makes it possible to ensure, independently of the drive height, a constant driving dynamics, in particular a constant lateral support capability of the wheel suspension especially in the driving dynamic limit range, which ultimately increases not only driving comfort but also driving safety.

The chassis according to the present invention for use in a motor vehicle with variably adjustable drive height can preferably be used in a passenger car or a truck. However, the use in other vehicles, such as commercial vehicles or the like, is likewise conceivable. Within the context of the invention, the term "chassis" according to aspects of the invention can in particular be understood to mean a combination of parts or components producing a connection of the body of a vehicle to the road. According to the present invention, the term "subframe assembly" can preferably be understood to mean a component for use in a motor vehicle, to which component the assembly-side linkage points of the wheel suspensions, among other things, can be fastened. The control arms according to aspects of the invention can in particular serve to connect a vehicle body to the wheel carrier and, for example, be designed as a rod-shaped control arm, triangular control arm, trapezoidal control arm, or cylindrical control arm. The control arms can preferably be movably fastened to the subframe assembly within the chassis according to aspects of the invention. The term "eccentric adjustment device" according to the present invention can preferably be understood to mean a control disk, arranged eccentrically on a shaft, for adjusting the basic camber and/or the toe-in.

In the context of a simple, fast, and effective option of adjusting a change in toe-in, it may in particular be advantageous if the eccentric adjustment devices are arranged at the control arm attachment points, wherein the at least one eccentric adjustment device the position of which can be varied is preferably arranged at a U3 control arm attachment point. The U3 control arm attachment point can in particular be a control arm attachment point of the lower traverse control arm.

Furthermore, it may be advantageously provided in the context of a simple, fast, and cost-effective connection or fastening of the insert element to the subframe assembly according to the present invention, that the insert element is arranged on the subframe assembly, preferably in an opening of the subframe assembly for receiving the insert element, wherein the insert element is in particular fastened in a form-locking manner in the opening of the subframe assembly. A form-locking fastening enables a particularly easy-to-produce connection without additional connecting elements, in particular even when access is difficult.

In addition, it may be advantageous if the insert element is designed in such a way that the position of at least one eccentric adjustment device can be varied by varying the positioning of the insert element on the subframe assembly, wherein the position of the at least one eccentric adjustment device can preferably be varied in the Z-direction. In this way, it is in particular possible to easily and quickly remedy deviations from the toe-in change profiles of a motor vehicle due to a different drive height. In a use of the chassis according to aspects of the invention in a motor vehicle, the term "variation in the Z-direction" can in particular be understood as a variation in the vehicle position along a vehicle height that is perpendicular to the axles of the motor vehicle.

In addition, it may in particular be advantageous if the insert element is designed in such a way that it can be arranged at two different positions on the subframe assembly, wherein the different positions provide two different Z-locations for the at least one eccentric adjustment device. Such an embodiment of the chassis according to aspects of the invention in particular enables particularly simple and intuitive adjustability. By positioning the insert element in only two positions, an elaborate adjustment or positioning of the insert element can in particular be omitted. In order to further simplify positioning, the arrangement of positioning aids, such as recesses and corresponding projections, or arrows for finding correct positioning is furthermore conceivable.

With regard to a constructively simple and cost-effective option of varying the position of at least one eccentric adjustment device by varying the arrangement of the insert element, it can advantageously be provided according to aspects of the invention that the insert element has an opening for inserting an eccentric adjustment device, wherein the opening is preferably arranged asymmetrically within the surface of the insert element, in particular decentrally within the surface of the insert element. By forming an opening arranged asymmetrically, in particular decentrally, within a surface, it is in particular possible to selectively vary a position for receiving an eccentric adjustment device only along a Z-direction by simply rotating the insert element by 180° in or at the fastening position of the subframe assembly.

In order to simplify the insertion or fastening of the insert element in or to the subframe assembly, it is furthermore conceivable that a connecting element is provided for the form-locking and/or friction-locked fastening of the insert element to the subframe assembly, wherein the connecting element is in particular arranged between the subframe assembly and the insert element within the chassis. The connecting element can, for example, be arranged along a frame or projection which surrounds the opening of the subframe assembly and enables a simple form-locking connection to the insert element.

In order to provide a constructively simple way to ensure that even when a connecting element is arranged between a subframe assembly and an insert element, varying the position of at least one eccentric adjustment device by varying the arrangement of the insert element is still enabled, it may be advantageous if the connecting element has an opening, wherein the opening of the connecting element overlaps the opening of the subframe assembly and the opening of the insert element during an arrangement of the connecting element between the subframe assembly and the insert element within the chassis. In this case, the opening surface of the connecting element can in particular be smaller than the opening surface of the subframe assembly but larger than the opening surface of the insert element.

Furthermore, it may likewise be advantageous if the insert element has fastening means for the form-locking fastening to the connecting element, wherein the insert element preferably has at least two fastening means arranged opposite one another, wherein the fastening means are in particular designed in the form of clamping hooks or clamping lugs. One embodiment of the insert element with fastening means for the form-locking fastening to the connecting element in particular enables a simple production of a form-locking connection and at the same time a reliable connection. In order to ensure a particularly stable fastening, four or more fastening means may also be provided, for example.

In order to easily and quickly ensure a targeted adjustment of the drive height of a motor vehicle, it may also be advantageous if a forward-suspendable axle is provided for variably adjusting a drive height of the motor vehicle.

The subject matter of the invention is furthermore also a motor vehicle comprising a chassis described above. The motor vehicle according to aspects of the invention thus has the same advantages as already extensively described with respect to the chassis according to aspects of the invention.

Further advantages, features, and details of the invention arise from the following description, in which exemplary embodiments of the invention are described in detail with reference to the drawings.

BRIEF DESCRIPTION OF THE DRAWINGS

FIG. 1a schematically shows a partial view of a chassis according to aspects of the invention for use in a motor vehicle with variably adjustable drive height according to a first exemplary embodiment, FIG. 1b schematically shows a further partial view of the chassis according to aspects of the invention of FIG. 1a, FIG. 2 schematically shows a further partial view of the chassis according to aspects of the invention of FIG. 1a in a first position (left) and a second position (right), FIG. 3 schematically shows the profile of the change in toe-in for a motor vehicle according to aspects of the invention in the first position and in the second position, FIG. 4a schematically shows an insert element according to aspects of the invention for receiving an eccentric adjustment device, FIG. 4b schematically shows a connecting element according to aspects of the invention for the form-locking and/or friction-locked fastening of the insert element in an inserted state, FIG. 5a schematically shows an insert element according to aspects of the invention for receiving an eccentric adjustment device in an inserted state in a first position, FIG. 5b schematically shows an insert element according to aspects of the invention for receiving an eccentric adjustment device in an inserted state in a second position.

DETAILED DESCRIPTION OF THE INVENTION

Figure 2:
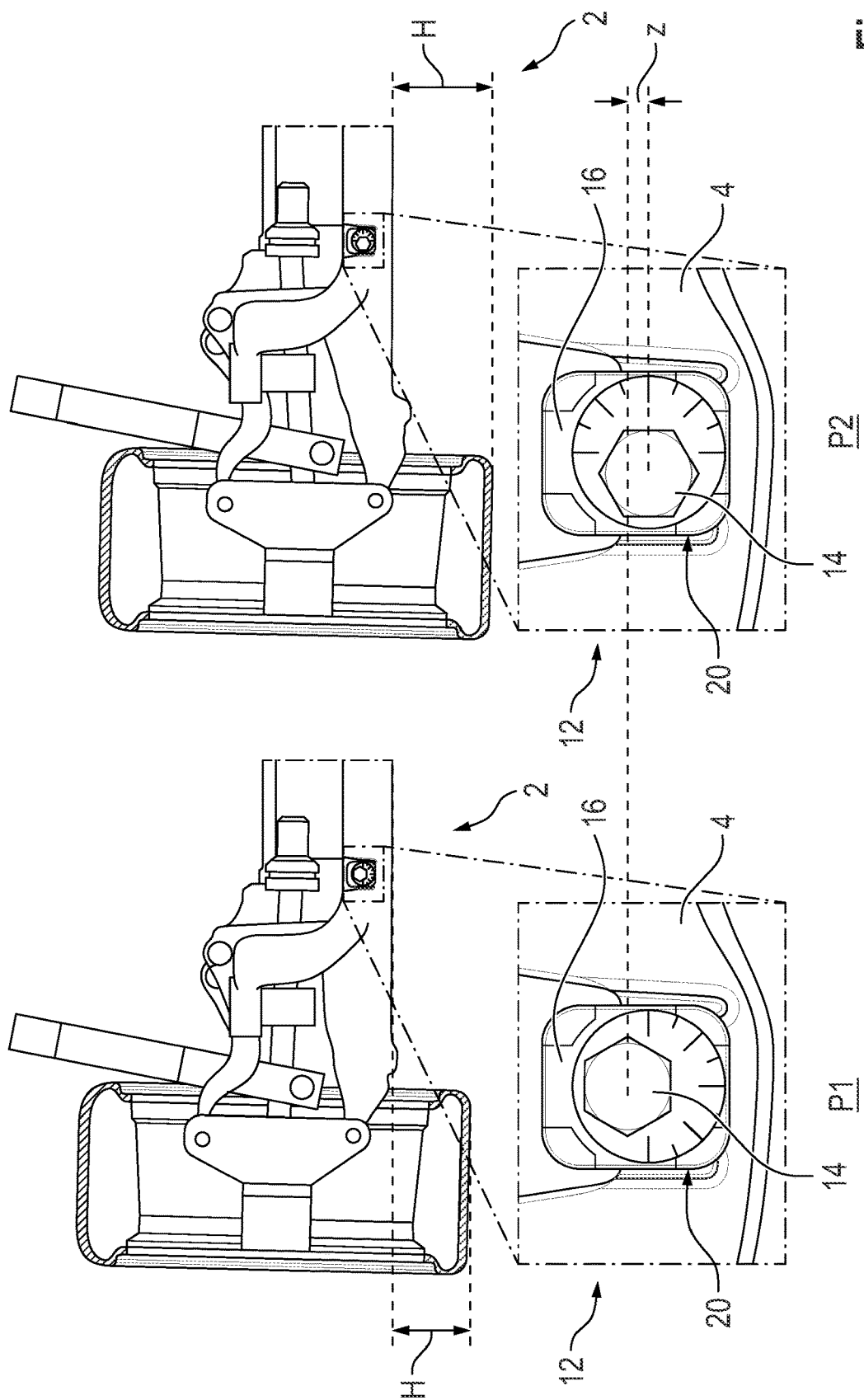

FIG. 1a shows a partial view of a chassis 2 according to aspects of the invention for use in a motor vehicle 80 with variably adjustable drive height H according to a first exemplary embodiment.

As can be seen according to FIG. 1a, the chassis 2 according to aspects of the invention comprises a subframe assembly 4 for fastening wheel suspensions 6 of a motor vehicle 80, a plurality of control arms 8 for guiding a wheel carrier 10, wherein the control arms 8 are fastened to the subframe assembly 4 via control arm attachment points 12. The chassis 2 according to aspects of the invention furthermore comprises a plurality of eccentric adjustment devices 14 for adjusting the toe-in V and the basic camber G of the motor vehicle 80 as well as an insert element 16 (not visible here) for receiving an eccentric adjustment device 14, wherein the insert element 16 is designed and can be arranged within the chassis 2 in such a way that the position of at least one eccentric adjustment device 14 can be varied by varying the arrangement of the insert element 16 within the chassis 2.

FIG. 1b shows a further partial view of the chassis 2 according to aspects of the invention of FIG. 1a, in which a further eccentric adjustment device 14 is arranged at the U3 control arm attachment point 12'.

FIG. 2 shows a further partial view of the chassis 2 according to aspects of the invention of FIG. 1a in a first position P1 (left) and a second position P2 (right).

As can be seen according to FIG. 2, the insert element 16 is in the present case arranged on the subframe assembly 4 in an opening 20 (not visible now) of the subframe assembly 4.

The insert element 16 is designed here in such a way that when increasing the drive height H in the Z-direction, the position of the eccentric adjustment device 14 arranged within the insert element 16 can be varied by varying the positioning of the insert element 16 on the subframe assembly 4.

Here, the insert element 16 is designed in the present case in such a way that it can be arranged in two different positions P1, P2 on the subframe assembly 4, wherein the different positions P1, P2 provide two different Z-locations for the at least one eccentric adjustment device 14.

Figure 3:
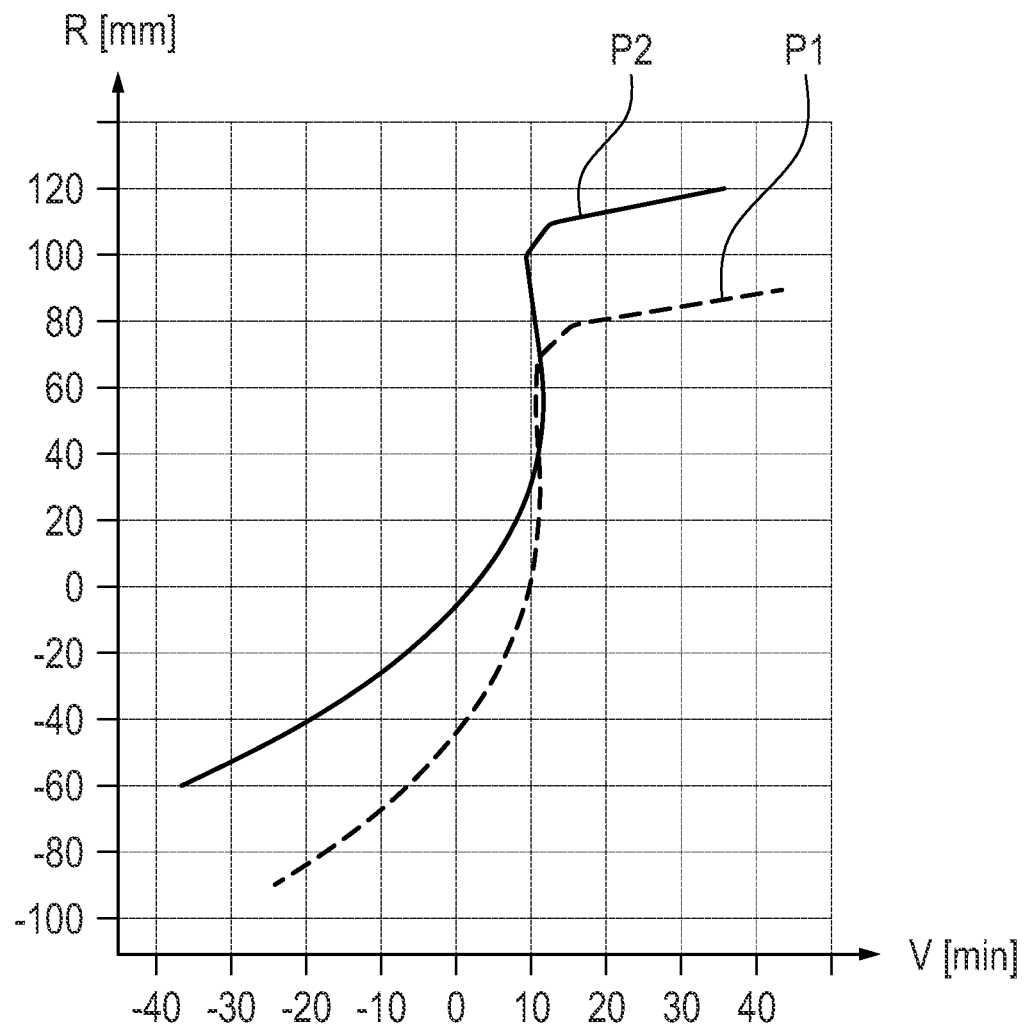

FIG. 3 shows the profile of the change in toe-in V for a motor vehicle 80 according to aspects of the invention in the first position P1 at a lower drive height H and in the second position P2 at an increased drive height H.

As can be seen according to FIG. 3, the changes in toe-in in the first position P1 and in the second position P2 show the same profile.

Figure 4B:
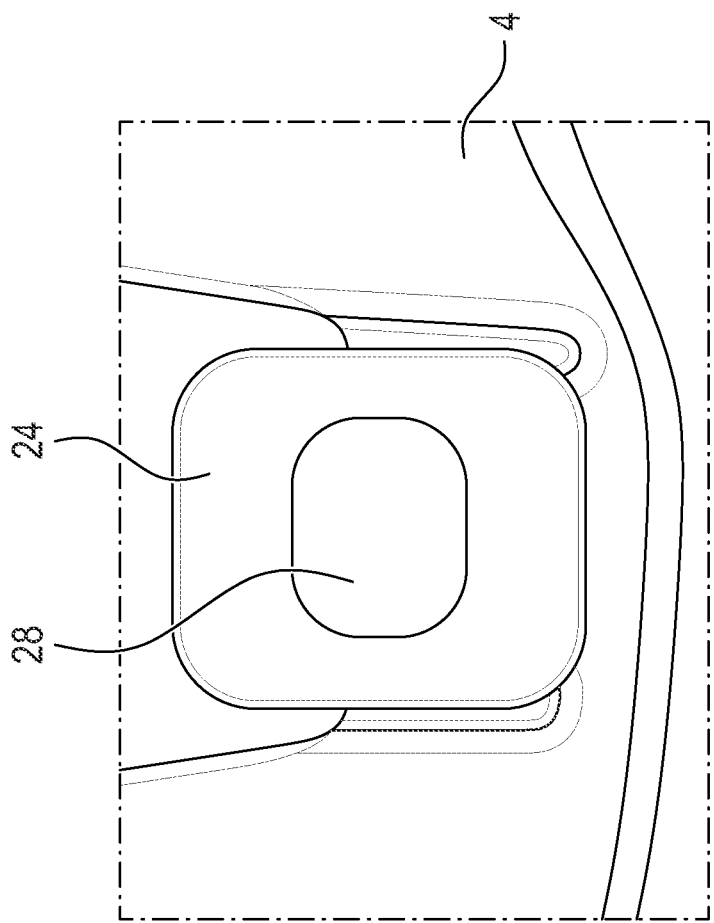
Figure 4A:
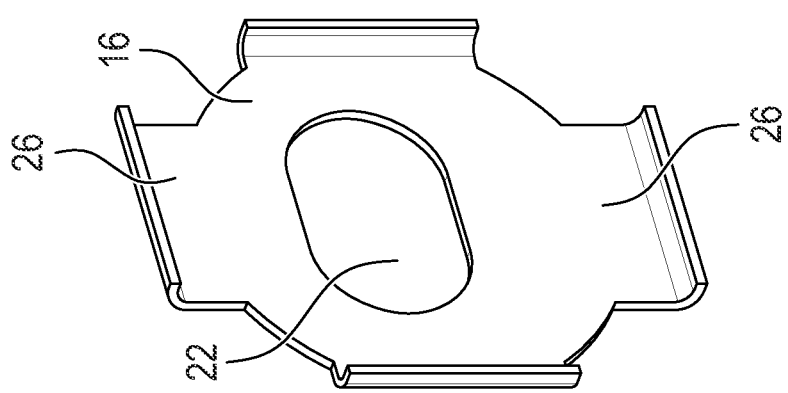

FIG. 4a shows an insert element 16 according to aspects of the invention for receiving an eccentric adjustment device 14.

As can be seen according to FIG. 4a, the insert element 16 has an opening 22 for inserting an eccentric adjustment device 14, wherein the opening 22 in the present case is arranged asymmetrically, in particular decentrally, within the surface of the insert element 16.

The insert element 16 furthermore comprises fastening means 26 for the form-locking fastening to a connecting element 24, wherein the insert element in the present case has four fastening means 26.

FIG. 4b shows a connecting element 24 according to aspects of the invention for the form-locking and/or friction-locked fastening of the insert element in an inserted state.

As can be seen according to FIG. 4b, the connecting element 24 is provided in the present case for the form-locking fastening of the insert element 16 to the subframe assembly 4 and has an opening 28.

Figure 5B:
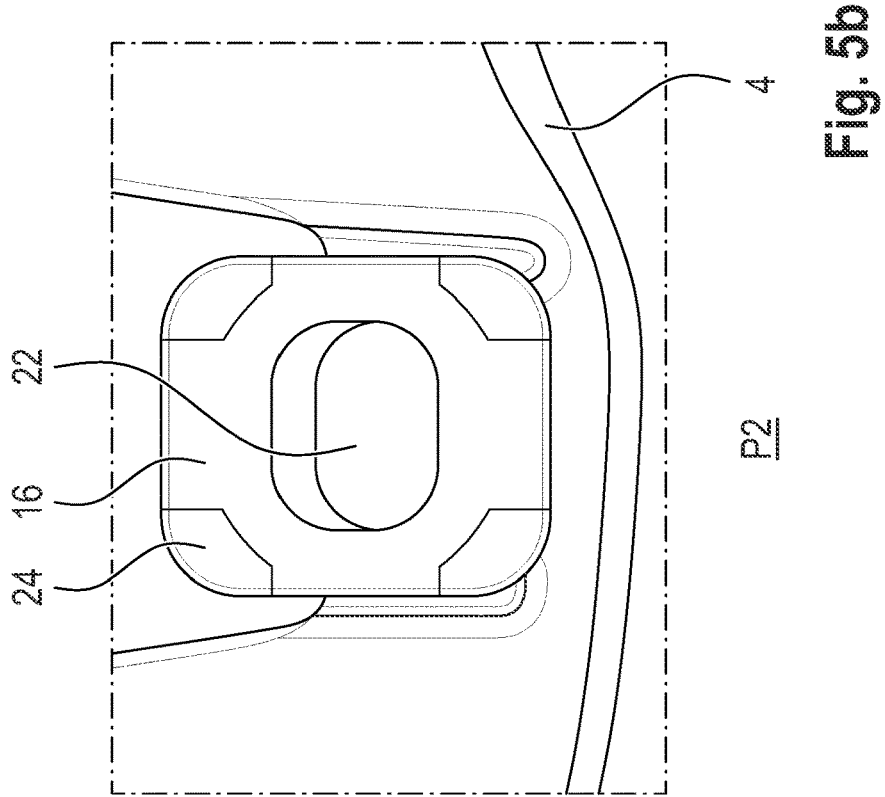
Figure 5A:
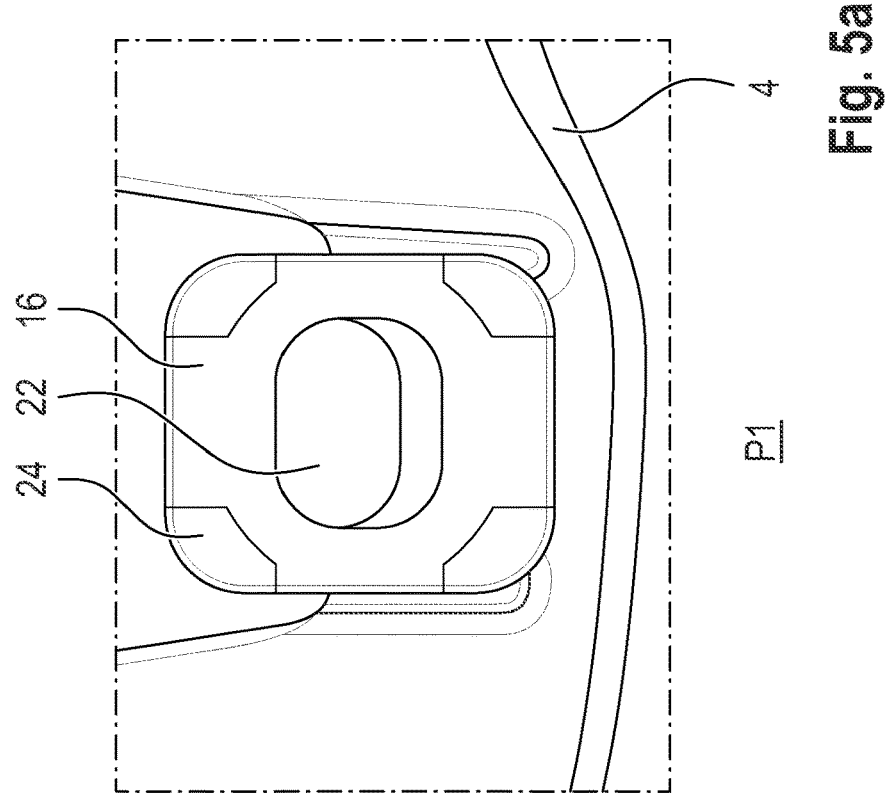

FIG. 5a shows an insert element 16 according to aspects of the invention for receiving an eccentric adjustment device 14 in an inserted state in a first position P1.

As can be seen according to FIG. 5a, the connecting element 24 is arranged between the subframe assembly 4 and the insert element 16 so that the opening 28 of the connecting element 24 overlaps the opening 20 of the subframe assembly 4 and the opening 22 of the insert element 24 during the arrangement of the connecting element 24 between the subframe assembly 4 and the insert element 16 within the chassis 2.

FIG. 5b finally shows an insert element 16 according to aspects of the invention for receiving an eccentric adjustment device 14 in an inserted state in the second position P2.

The above explanation of the embodiments describes the present invention solely in the context of examples.

Of course, if technically useful, individual features of the embodiments can be freely combined with one another without leaving the scope of the present invention.

What is claimed is:

1. A chassis for use in a motor vehicle with variably adjustable drive height (H), said chassis comprising:
   a subframe assembly for fastening wheel suspensions of the motor vehicle,
   a plurality of control arms for guiding a wheel carrier, wherein the control arms are fastened to the subframe assembly via control arm attachment points,
   a plurality of eccentric adjustment devices for adjusting a toe-in and a basic camber of the motor vehicle, and
   an insert element for receiving one of the eccentric adjustment devices,
   wherein the insert element is configured to be mounted to the chassis in multiple mounting orientations that differ from one another,
   wherein a mounting position of said one of the eccentric adjustment devices on the chassis varies depending upon a selected mounting orientation of the multiple mounting orientations of the insert element on the chassis.

2. The chassis according to claim 1, wherein the eccentric adjustment devices are positioned at the control arm attachment points.

3. The chassis according to claim 1, wherein the insert element is arranged in an opening of the subframe assembly, and the insert element is fastened in the opening of the subframe assembly in a form-locking manner.

4. The chassis according to claim 1, wherein the mounting position of said one of the eccentric adjustment devices on the chassis varies in a Z direction depending upon the selected mounting orientation of the multiple mounting orientations of the insert element on the chassis.

5. The chassis according to claim 1, wherein the insert element is configured to be positioned at two different positions (P1, P2) on the subframe assembly, wherein the different positions (P1, P2) provide two different Z-locations for said one of the eccentric adjustment devices.

6. The chassis according to claim 1, wherein the insert element has an opening for inserting said one of the eccentric adjustment devices, wherein the opening is arranged asymmetrically within a surface of the insert element and decentrally within the surface of the insert element.

7. The chassis according to claim 1, further comprising a connecting element for a form-locking or a friction-locked fastening of the insert element to the subframe assembly, wherein the connecting element is arranged within the chassis at a location between the subframe assembly and the insert element.

8. The chassis according to claim 7, wherein the connecting element has an opening that overlaps an opening of the subframe assembly and an opening of the insert element.

9. The chassis according to claim 7, wherein the insert element has at least two fastening means arranged opposite one another, and wherein each fastening means comprise a bent portion for form-locking fastening to the connecting element.

10. A motor vehicle comprising the chassis according to claim 1.

* * * * *

UNITED STATES PATENT AND TRADEMARK OFFICE
CERTIFICATE OF CORRECTION

| | | |
|---|---|---|
| PATENT NO. | : 11,766,909 B2 | Page 1 of 1 |
| APPLICATION NO. | : 17/942235 | |
| DATED | : September 26, 2023 | |
| INVENTOR(S) | : Lutz Bauer | |

It is certified that error appears in the above-identified patent and that said Letters Patent is hereby corrected as shown below:

On the Title Page

Item (30), Insert:
--Foreign Application Priority Data
Sept. 20, 2021   (DE) 10 2021 124 181.2--

Signed and Sealed this
Twenty-first Day of November, 2023

Katherine Kelly Vidal
*Director of the United States Patent and Trademark Office*